(12) United States Patent
Koseoglu (10) Patent No.: US 11,148,948 B2
(45) Date of Patent: Oct. 19, 2021

(54) GASIFICATION OF DISULFIDE OIL TO PRODUCE HYDROGEN AND CARBON MONOXIDE (SYNGAS)

(71) Applicant: Saudi Arabian Oil Company, Dhahran (SA)

(72) Inventor: Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 131 days.

(21) Appl. No.: 16/210,597

(22) Filed: Dec. 5, 2018

(65) Prior Publication Data

US 2020/0180953 A1 Jun. 11, 2020

(51) Int. Cl.
*C01B 3/36* (2006.01)
*B01J 19/18* (2006.01)

(52) U.S. Cl.
CPC ............. *C01B 3/36* (2013.01); *B01J 19/1893* (2013.01); *C01B 2203/0283* (2013.01); *C01B 2203/063* (2013.01); *C01B 2203/1614* (2013.01); *C01B 2203/1657* (2013.01); *C01B 2203/1666* (2013.01); *C01B 2203/84* (2013.01)

(58) Field of Classification Search
CPC ...................................................... C01B 3/36
See application file for complete search history.

(56) References Cited

U.S. PATENT DOCUMENTS

| | | | | |
|---|---|---|---|---|
| 4,115,074 A | * | 9/1978 | Yoshida | C01B 3/386 423/650 |
| 5,466,361 A | * | 11/1995 | Heck | C10B 55/00 208/125 |
| 2006/0254956 A1 | * | 11/2006 | Khan | C10G 47/26 208/209 |
| 2009/0020456 A1 | * | 1/2009 | Tsangaris | C10J 3/523 208/133 |
| 2012/0055849 A1 | | 3/2012 | Bourane et al. | |
| 2013/0028834 A1 | * | 1/2013 | Koseoglu | C10J 3/466 423/655 |
| 2014/0332724 A1 | * | 11/2014 | Tsangaris | C10J 3/726 252/373 |
| 2015/0080626 A1 | * | 3/2015 | Boon | C10J 3/54 585/242 |
| 2016/0045841 A1 | * | 2/2016 | Kaplan | B01D 3/06 429/49 |

OTHER PUBLICATIONS

International Search Report and Written Opinion dated Feb. 17, 2020 in counterpart International Application PCT/US2019/063816 filed Nov. 28, 2019.
Reiner et al., "Gas Production, 2. Processes", Ullmann's Encyclopedia of Industrial Chemistry, Oct. 2011, vol. 16, pp. 423-482.

* cited by examiner

Primary Examiner — Paul A Wartalowicz
(74) Attorney, Agent, or Firm — Abelman, Frayne & Schwab (57) ABSTRACT

A disulfide oil hydrocarbon stream or a mixture of a disulfide oil hydrocarbon stream and a residual oil is partially oxidized in a gasifier to produce a hot raw synthesis gas containing hydrogen and carbon monoxide which can be passed to a steam generating heat exchanger to cool the hot raw synthesis gas and to produce steam which can be used to generate electricity via a turbine and, optionally, subjecting the cooled synthesis gas to the water/gas shift reaction to produce additional hydrogen and carbon dioxide.

15 Claims, 4 Drawing Sheets

PRIOR ART

GASIFICATION OF DISULFIDE OIL TO PRODUCE HYDROGEN AND CARBON MONOXIDE (SYNGAS)

BACKGROUND OF THE INVENTION

Field of the Invention

This invention relates to the gasification of disulfide oils to produce hydrogen and electricity.

Description of Related Art

It is known in the art that the presence of mercaptans in petroleum products are undesirable because of their unpleasant odor and corrosivity and also because they degrade the stability of end-product fuels. Processes in oil refineries and natural gas processing plants that remove mercaptans and/or hydrogen sulfide ($H_2S$) are commonly referred to as sweetening processes because they result in products which no longer have the sour, foul odors of mercaptans and hydrogen sulfide. The liquid hydrocarbon disulfides can remain in the sweetened end products; or they can be used as part of the petroleum refinery or natural gas processing plant fuel; or they can be subjected to further downstream processing.

The MEROX designation is derived from the mercaptan oxidation step of the process. The MEROX process is a proprietary catalytic mercaptan oxidation process widely used in petroleum refineries and natural gas processing plants to remove mercaptans contained in end-products such as LPG, propane, butanes, light naphtha, kerosene and jet fuel by converting them into liquid hydrocarbon disulfides, or disulfide oil (DSO) compounds. It is an integrated process comprising the mercaptan extraction step in which mercaptans react with an aqueous caustic solution in the presence of a catalyst to form an alkylthiolate, which is then oxidized in a wet air oxidation step to produce disulfide oils and a regenerated caustic solution that is recycled to the extraction step. The alkaline environment required in some versions of the practice of the MEROX process is provided by an aqueous solution of a strong base, such as sodium hydroxide (NaOH), and in other versions of the process, by ammonia, which is a relatively weaker base than sodium hydroxide, but also volatile and the ammonia must be handled with special care due to its irritant and toxicity properties. In other versions of the process, an aqueous solution of potassium hydroxide is used to provide the alkaline environment needed.

The stepwise reaction schemes for the generalized MEROX process beginning with the treatment of the mercaptan are as follows:

$$2RSH + 2NaOH \rightarrow 2NaSR + 2H_2O \quad (1)$$

In the above reaction, RSH is a mercaptan and R is an organic group such as a methyl, ethyl, propyl or other hydrocarbon group. For example, the ethyl mercaptan (ethanethiol) has the formula $C_2H_5SH$.

The catalyst used in some versions of the MEROX process is a water-soluble liquid and in other versions the catalyst is impregnated onto charcoal granules. The catalyst used in the MEROX process can be an organometallic compound.

The second step is referred to as regeneration and it involves heating and oxidizing the caustic solution leaving the extractor. The oxidation results in converting the extracted mercaptans to organic disulfides (RSSR). These disulfide oils are water-insoluble liquids that are separated and decanted from the regenerated aqueous caustic solution. The regeneration reaction scheme is as follows:

$$4NaSR + O_2 + 2H_2O \rightarrow 2RSSR + 4NaOH \quad (2)$$

In reactions (1) and (2), R is methyl or a hydrocarbon chain that can be straight, branched or cyclic. The R chains can be saturated or unsaturated. In most petroleum and diesel fractions, mixtures of mercaptans will occur so that the R groups in the disulfide oil (RSSR) can be the same or different groups.

The liquid disulfide oils created by the conversion of the mercaptans do not have these undesirable characteristics and have been retained in the MEROX treated fuels or removed and used elsewhere in the petroleum refinery. The MEROX process is generally more economical than a catalytic hydrodesulfurization process and achieves much the same result for the mercaptans removal. Economic and practical drawbacks associated with hydrodesulfurization processes include additional dedicated facilities to which the disulfide compounds must be transferred, use of expensive and sensitive catalysts and the treatment and disposal of the by-product sulfur-containing compounds.

On a global basis, MEROX mercaptan oxidation units are commonly found in refineries and the disulfides generated are blended with fuel oil or processed in hydrotreating or hydrocracking process units or injected into the ground to dispose them. When the disulfides are added to fuel oil, they are typically burned to produce steam or provide other utilities. This use can raise environmental concerns where the combustion gases with sulfur-containing constituents are emitted in the refinery. The disulfides may undergo hydroprocessing, but hydroprocessing is not a favored method for the economic disposal of waste oil because of the additional hydrogen that is required and consumed.

Gasification of hydrocarbon feeds is well known in the art and it is practiced worldwide and is applicable to solids and heavy liquid fossil fuels. The gasification process uses partial oxidation at high temperature, i.e., greater than 800° to convert carbonaceous materials, such as coal, petroleum, biofuel, or biomass to hot synthesis gas ("syngas"). The syngas consisting of carbon monoxide and hydrogen can be burned directly in internal combustion engines, or used in the manufacture of various chemicals, such as methanol via known synthesis processes and to make synthetic fuels via the Fischer-Tropsch process.

In refinery operations, the main process block is known as the Integrated Gasification Combined Cycle (IGCC) consisting of a number of steps that eventually convert the feedstock into hydrogen, power and steam. The process flow diagram of a conventional IGCC of the prior art, which includes a feed preparation section, a gasification reactor, an air separation unit, a syngas quench and cooling unit, a water-gas shift reactor, an acid gas removal (AGR) and sulfur recovery unit (SRU), a gas turbine, a heat recovery steam generator (HRSG), and a steam turbine.

In a conventional IGCC, a feedstock is introduced to a feed preparation section. The prepared feedstock is then passed to a gasification reactor with a predetermined amount of oxygen produced from an air separation unit. The feedstock is partially oxidized in a gasification reactor to produce a hot syngas which is conveyed to syngas quench and cooling units. Hot syngas is cooled with boiler feed water to produce cooled syngas and steam. A portion of the steam is passed to and used in a water-gas shift reactor to produce shifted gas, and the remaining portion of the steam is consumed in the HRSG. Shifted gas is treated in an AGR/SRU unit to separate and discharge at least carbon dioxide and sulfur. A second portion of the hydrogen syngas is passed to a gas turbine with air feed and combusted to produce electricity. The high pressure combustion gas discharge from the gas turbine is conveyed to a HRSG to generate steam which is used in a steam turbine to produce additional electricity.

The three principal types of gasification reactor technologies are the moving bed, fluidized bed and entrained-flow systems. Each of the three types can be used with solid fuels, but only the entrained-flow reactor has been demonstrated to efficiently process liquid fuels. In an entrained-flow reactor, the fuel, oxygen and steam are injected at the top of the gasifier through a co-annular burner. The gasification usually takes place in a refractory-lined vessel which operates at a pressure of about 40 bars to 60 bars and a temperature in the range of from 1300° to 1700° C.

There are two types of gasifier wall construction: refractory and membrane. The gasifier conventionally uses refractory liners to protect the reactor vessel from corrosive slag, thermal cycling, and the elevated temperatures that range from 1400° to 1700° C. The refractory is subjected to the penetration of corrosive components from the generation of the syngas and slag and, thereafter, to subsequent reactions in which the reactants undergo significant volume reactions that result in strength degradation of the refractory materials. The replacement of the degraded refractory linings can cost several millions of dollars a year and several weeks of downtime for a given reactor. Up until now, the solution has been the installation of a second or parallel gasifier to provide the necessary continuous operating capability during maintenance downtime, but the undesirable consequence of this duplication is a significant increase in the capital costs associated with the unit operation.

An alternative membrane wall gasifier technology uses a cooling screen protected by a layer of refractory material to provide a surface on which the molten slag solidifies and flows downwardly to the quench zone at the bottom of the reactor. The advantages of the membrane wall reactor include reduced reactor dimensions as compared to other systems; a significantly greater average on-stream time of 90%, as compared to an on-stream time of 50% for a refractory wall reactor; elimination of the need to have a parallel reactor to maintain continuous operation as in the case of refractory wall reactors; and the build-up of a layer of solid and moving liquid/molten slag that provides self-protection to the water-cooled wall sections.

In a membrane wall gasifier, the build-up of a layer of solidified mineral ash slag beneath the moving molten slag beneath the moving molten slag on the wall acts as an additional protective surface and insulator to minimize or reduce refractory degradation and heat losses through the wall. The water-cooled reactor design also avoids what is termed "hot wall" gasifier operation, which requires the construction of thick multiple-layers of expensive refractories which are subject to degradation. In the membrane wall reactor, the slag layer is renewed continuously with the deposit of solids on the relatively cool surface. Further advantages include shorter start-up/shut down times; lower maintenance costs than the refractory type reactor; and the capability of gasifying feedstocks with high ash content, thereby providing greater flexibility in treating a wider range of coals, petcoke, coal/petcoke blends, biomass co-feed and liquid feedstocks.

There are two principal types of membrane wall reactor designs that are adapted to process solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use. In both of these reactors, the flow of pressurized cooling water in the tubes is controlled to cool the refractory and ensure the downward flow of the molten slag. Both systems have demonstrated high utility with solid fuels, but not with liquid fuels.

The gasification reactor is operated to produce synthesis gas, or syngas comprised of CO and $H_2$. For the production of liquid fuels and petrochemicals, the key parameter is the mole ratio of hydrogen-to-carbon monoxide in the dry syngas. This ratio is usually between 0.85:1 and 1.2:1, depending upon the characteristics of the feedstock. Additional treatment of the syngas is needed to increase this ratio of hydrocarbon-to-carbon to 2:1 for Fischer-Tropsch applications, or to produce additional hydrogen through the water-gas shift reaction represented by CO+H2O→CO2+ H2. In some cases, part of the syngas is burned together with some of the off gases in a combined cycle to produce electricity and steam. The overall efficiency of this process is between 44% and 48%.

A problem addressed by the present invention is the need for a cost effective and environmentally friendly alternative to those discussed above for the disposal of disulfide oil, which as previously noted is an otherwise low value by-product of the sweetening of hydrocarbon oil to remove mercaptans.

Another problem addressed by the present invention is the need for an economical and efficient method for the recovery of a clean, sulfur-free hydrocarbon fuel from liquid disulfides produced in the MEROX process.

SUMMARY OF THE INVENTION

The above needs are met and other advantages are provided by the process of the present invention that economically converts disulfide oils of relatively low value, or a blend of the disulfide oils and a residual oil stream that boils above 370° C. to produce syngas that can be used to produce methanol and/or synthetic fuels, and/or an enriched hydrogen system that can be used as a feedstream for other processes in the same refinery.

In this process, a hydrocarbon stream containing disulfide oils that have been obtained by:

a. contacting a mercaptan-containing hydrocarbon feedstream with an aqueous caustic solution to oxidize the mercaptans and produce a spent caustic solution and mercaptan-free hydrocarbons;

b. subjecting the spent caustic and hydrocarbons to a wet air oxidation step to regenerate the spent caustic and provide a liquid hydrocarbon reaction mixture that is comprised of sulfur-free hydrocarbons and disulfide oils;

c. separating the regenerated aqueous caustic solution from the liquid hydrocarbon reaction mixture and recycling the caustic to step (a); where the:

d. the disulfide oils from the hydrocarbon reaction mixture are separated and recovered;

e. introducing the disulfide oils as the feedstream to a gasification reactor with a predetermined amount of oxygen and steam based on the carbon content of the disulfide oil;

f. subjecting the disulfide oil feedstream to a partial oxidation reaction to produce hydrogen and carbon monoxide in the form of a hot raw synthesis gas;

g. passing the hot raw synthesis gas to a steam-generating heat exchanger to cool the hot raw synthesis gas and to produce steam;

h. introducing the steam from the heat exchanger into a turbine to produce electricity; and i. recovering the cooled synthesis gas.

The disulfide oils recovered from the hydrocarbon reaction mixture produced as described above can optionally be mixed with a residual hydrocarbon stream before being introduced into the gasification reactor.

As noted above, it is known in the art to subject disulfide oils to hydroprocessing, but the process is not favored for disposal of waste oil because additional hydrogen must be supplied in excess, and that which is not consumed must be recovered for reasons of economy. In the process of the present invention, the treatment of disulfide oils produces hydrogen. This process also produces electricity from disulfide oil waste stream which can be used in the process or passed to the refinery refinery's grid.

In the description that follows, the terms "disulfide oil", "disulfide oils" "disulfide compounds", "DSO", "DSO mixture" "DSO composition" and "DSO compound(s)", may be used interchangeably for convenience.

BRIEF DESCRIPTION OF THE DRAWINGS

The invention will be described in greater detail below and with reference to the attached drawings in which.

DETAILED DESCRIPTION OF THE INVENTION

Figure 1:
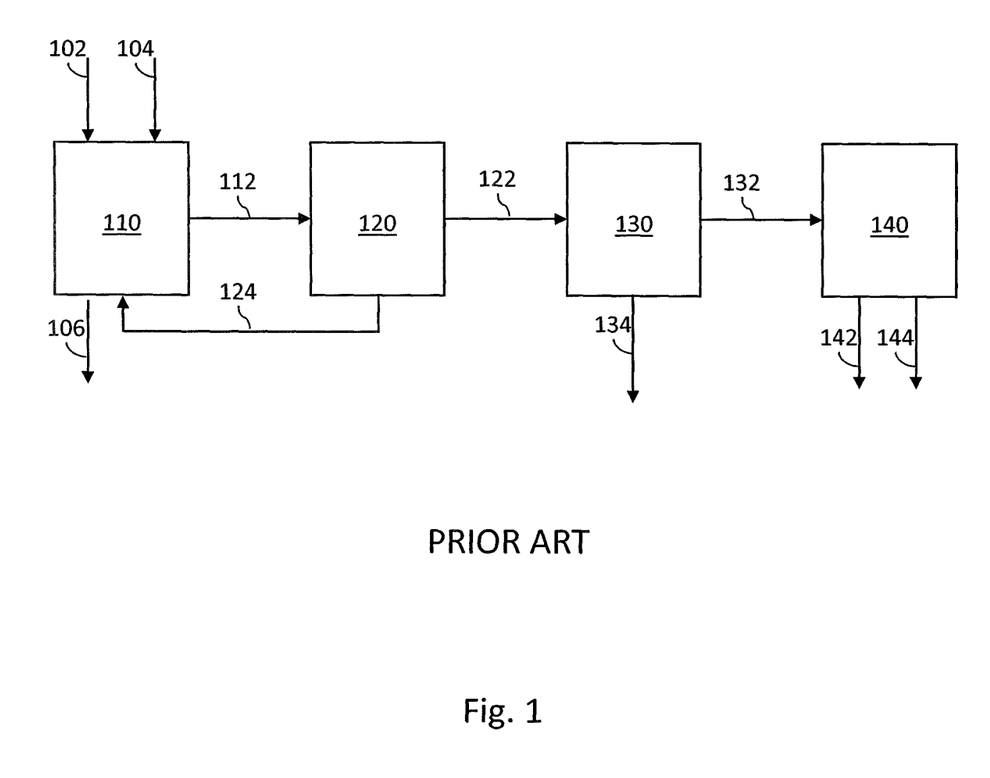
FIG. 1 is a schematic illustration of a typical mercaptan oxidation (MEROX) process of the prior art.

Referring now to the schematic illustration FIG. 1, a process in accordance with the prior art for treating liquid hydrocarbon disulfide components, e.g., by-products of the MEROX process, of the prior art will be described.

An aqueous caustic solution 102 and a hydrocarbon feed stream 104 containing mercaptans is treated in a mercaptan oxidation unit 110 in the presence of a catalyst (not shown) to produce a spent caustic solution, such as sodium alkylthiolate, and a mercaptan-free hydrocarbons mixture, which are separated internally within the mercaptan oxidation unit 110. The mercaptan-free hydrocarbons mixture 106 is discharged from the system.

The spent caustic solution 112 is sent to a wet air oxidation unit 120 for regeneration by oxidation to produce a regenerated caustic solution 124 which is recycled to the mercaptan oxidation unit 110 a by-product liquid hydrocarbon disulfide oil stream 122.

The by-product liquid hydrocarbon disulfide oil stream 122 is oxidized in gas-phase oxidation unit 130 to produce a sulfur dioxide ($SO_2$) and hydrogen sulfide ($H_2S$) stream 132 and a hydrocarbon stream 134 which is substantially free of sulfur. In some embodiments, the sulfur content of the treated hydrocarbon stream 134 is less than 100 ppm, less than 10 ppm, or less than 1 ppm. The gaseous $SO_2$ and $H_2S$ stream 132 is sent to a Claus unit 140 where $SO_2$ is reacted with $H_2S$ to produce elemental sulfur 142 and water 144 according to the conventional prior art Claus process.

Figure 2:
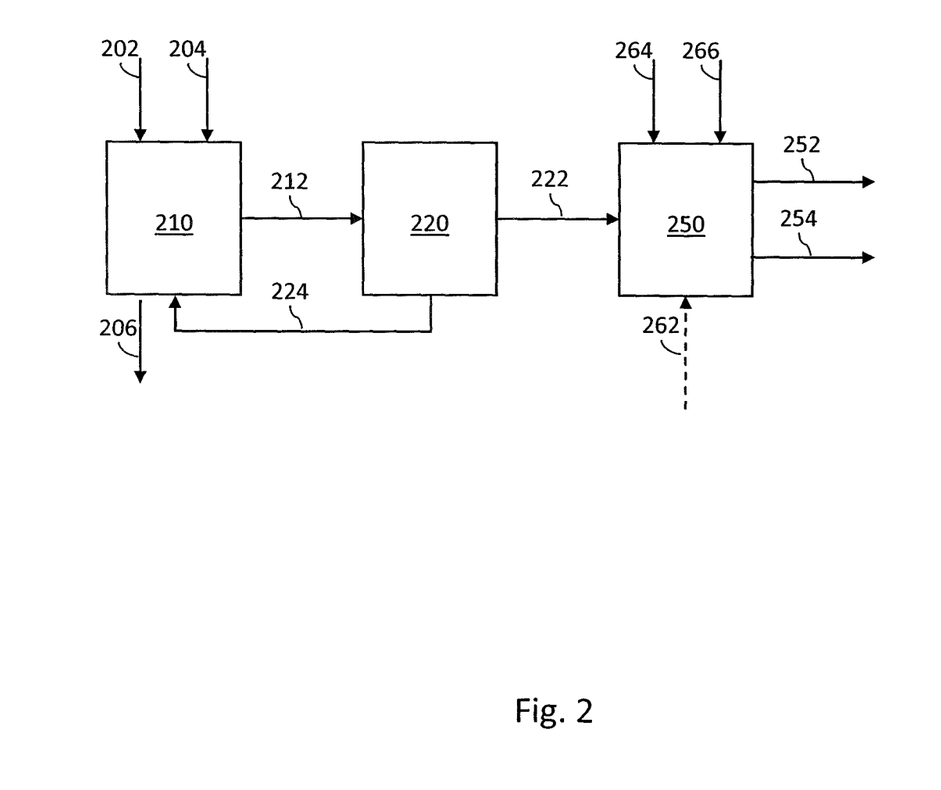
FIG. 2 is a schematic illustration of an integrated mercaptan oxidation (MEROX) and disulfide oil gasification process according to the present invention.

An embodiment of the process of the present disclosure for treating the MEROX process by-product disulfide in a gasifier will be described with reference to FIG. 2, which in part corresponds to the process described in connection with FIG. 1. An aqueous caustic solution 202 and a hydrocarbon feed stream containing mercaptans 204 is treated in a mercaptan oxidation unit 210 to produce a spent caustic solution, such as sodium alkylthiolate, and a mercaptan-free hydrocarbons mixture, which are separated internally within the mercaptan oxidation unit 110. This separation generally occurs in a counter-current flow apparatus. The mercaptan-free hydrocarbon mixture 206 is recovered from the system.

The spent caustic solution 212 is sent to a wet air oxidation unit 220 for regeneration by oxidation to produce a by-product liquid hydrocarbon disulfide oil stream 222 and a regenerated caustic solution 224 which is recycled to the mercaptan oxidation unit 110.

The recovered hydrocarbon disulfide oil stream 222 is subjected to partial oxidation in a gasification apparatus 250, also referred to as a gasifier or gasification reactor. Gasification reactor 250 can be either a refractory gasification reactor or a membrane wall gasification reactor. A predetermined volume of oxygen or oxygen-containing gas stream 264 and steam 266 are introduced into gasification reactor 250. In embodiments where gasifier 250 is a membrane wall gasifier, a conduit 262 is provided for introducing a predetermined amount of solid slag-producing material into the gasifier. Gasification reactor 250 produces a hot syngas 252, which is passed to a heat exchanger which in turn produces steam that is introduced to a turbine to produce electricity 254 which can be utilized in various refinery processes.

Figure 3:
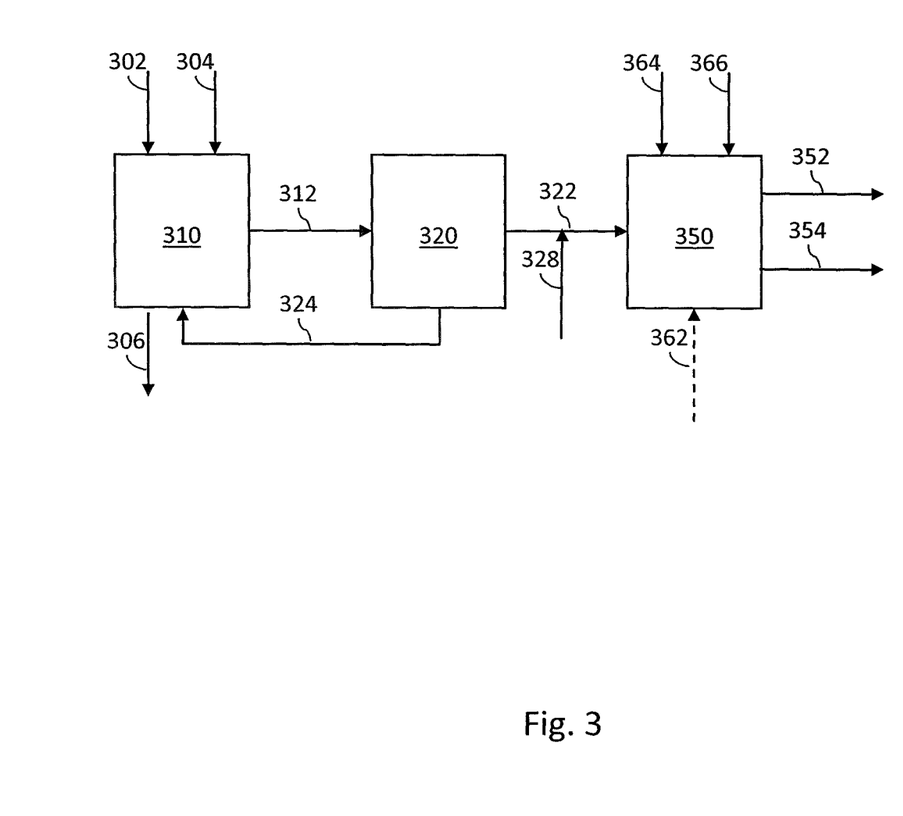
FIG. 3 is a schematic illustration of an integrated MEROX and disulfide oil and residual oil gasification process according to the present invention.

An embodiment of the process of the present disclosure for treating a mixture of by-product disulfide oils and residual hydrocarbons in a gasifier will be described with reference to FIG. 3 which is similar to the process described above with reference to FIG. 2. In the process depicted in FIG. 3, a residual hydrocarbon stream 328 is mixed or blended with disulfide oil stream 322 before entering gasification reactor 350. The residual hydrocarbon stream 328 can be a residual oil boiling above 370° C. and up to 2000° C. derived from a refinery source such as crude oils, bio oils, intermediate refinery products such as atmospheric and vacuum distillation residua, deasphalted oils, delayed coking products, FCC cycle or decanted oils, and combinations thereof.

Figure 4:
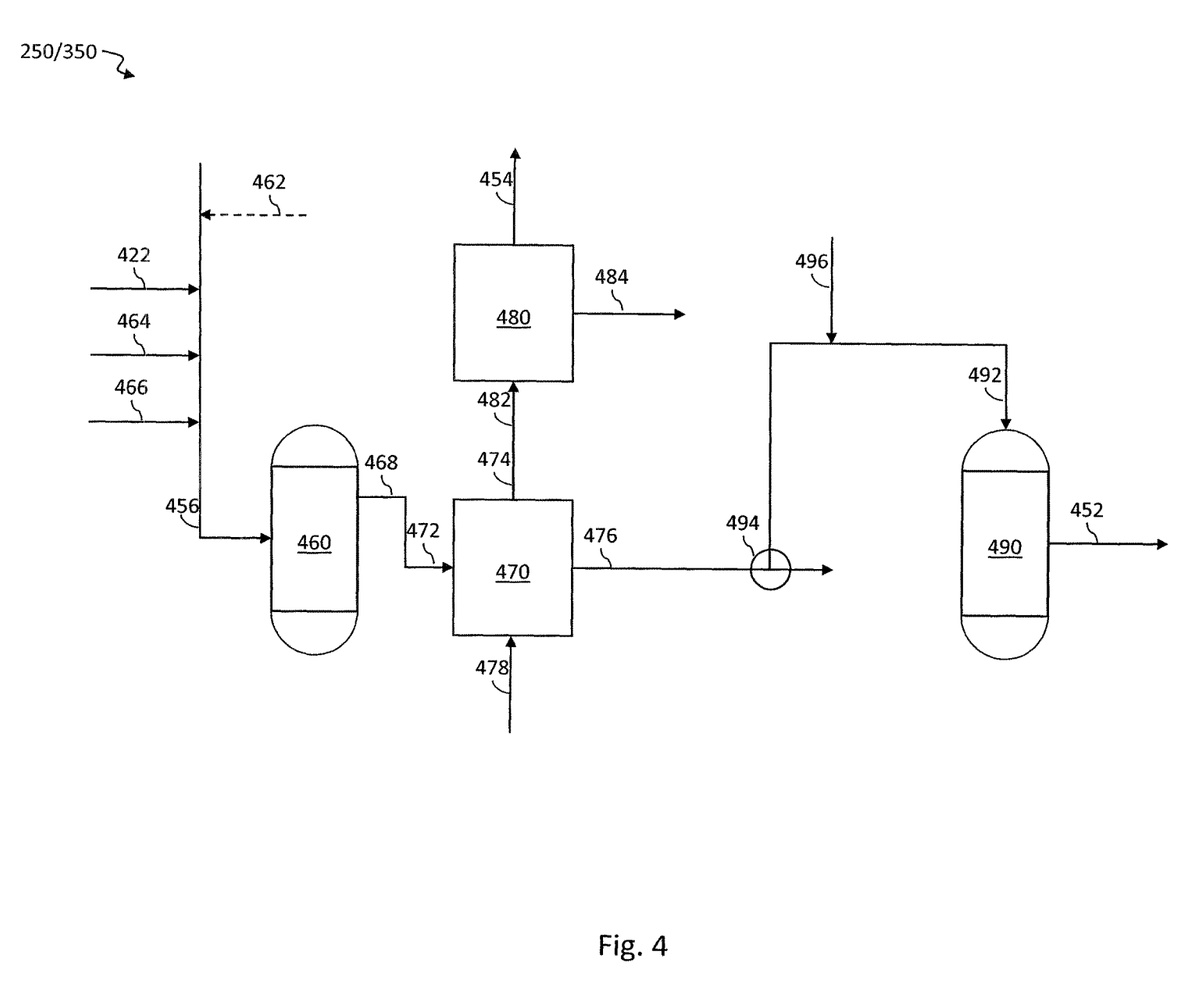
FIG. 4 is a schematic illustration of a gasification reactor system for the practice of the process according to the present disclosure.

With reference to FIG. 4, the gasification system includes a gasification reactor 460, a heat exchanger 470, a turbine 480 and a water-gas shift reaction vessel 490. The gasification reactor can be a refractory gasification reactor or a membrane wall gasification reactor. Note that while the embodiments described herein include a water-gas shift reaction scheme to enhance the output of hydrogen by conversion of some or all of the carbon monoxide in the syngas, alternative embodiments can be practiced without the water-gas shift reaction.

Gasification reactor 460 includes an inlet 456 in fluid communication with a conduit for introducing the disulfide oil hydrocarbon stream 422, a conduit 464 for introducing a controlled amount of pressurized oxygen or an oxygen-containing gas, and a conduit 466 for introducing a predetermined stoichiometeric amount of steam. The disulfide oil containing hydrocarbon stream can be a disulfide oil stream, e.g., as in FIG. 2, or a blend of disulfide oil and residual hydrocarbon stream, e.g., as in FIG. 3. Gasification reactor 460 also includes an outlet 468 for discharging hot raw syngas.

Steam generating heat exchanger 470 includes an inlet 472 in fluid communication with outlet 468 of the gasification reactor 460, an inlet 478 admitting cooling water, an outlet 474 for discharging steam, and an outlet 476 for discharging cooled syngas.

Turbine 480 includes a high pressure steam inlet 482 in fluid communication with outlet 474 of the heat exchanger 470, and an electrical conductor 454 for transmitting the electricity generated, and an outlet 484 for low pressure stream.

The optional water-gas shift reaction vessel 490 includes an inlet 492 in fluid communication with outlet 476 of the heat exchanger 470 via a three-way valve 494 for receiving cooled syngas and a conduit 496 for introducing a controlled amount of steam, and an outlet 452 for discharging carbon dioxide and a hydrogen-rich shifted syngas product.

In the practice of the method of the invention, disulfide oil-containing hydrocarbon stream 422 is introduced as a pressurized feedstream into the gasification reactor 460 along with a predetermined amount of oxygen or an oxygen-containing gas via conduit 464 to support the partial-oxidation reaction and a predetermined amount of steam via conduit 466. In embodiments employing a membrane wall gasification reactor, a predetermined amount of solid ash-producing material that will form a protective layer of slag on the walls of the reactor is interchanged with the feed or separately via conduit 462. In order to optimize the operation of the reactor and the production of syngas, an analysis of the carbon content of the disulfide oil hydrocarbon feed is predetermined in order to determine the stoichiometric amount of oxygen and steam that is to be introduced into the partial oxidation gasifier. One method of carbon analysis that is suited for this purpose is described in ASTM D-5291.

In embodiments where a membrane wall gasifier is used, disulfides containing hydrocarbon stream 422 and solid material are mixed, e.g., using an inline mixer, a flow-through mixing vessel or other known apparatus. The mixture of crude oil and solid ash-producing material is partially oxidized in the membrane wall gasification reactor 460 to produce a hot raw syngas comprising hydrogen and carbon monoxide.

Hot raw syngas is discharged from outlet 468 of the gasification reactor 460 and passed to inlet 472 of the heat exchanger 470 to produce a cooled syngas that is discharged via outlet 476. Steam discharged from outlet 474 of the heat exchanger 470 is passed to inlet 482 of turbine 480 to produce electricity that is transmitted via conductor 454 for use in the gasifier circuit or passed to the refinery grid. Low pressure stream from the turbine is discharged via outlet 484.

In certain embodiments, at least a portion of the cooled syngas is conveyed via valve 494 to inlet 492 of the water-gas shift reaction vessel 490 with steam introduced via conduit 496. The steam can optionally be derived from the steam generator 470. Carbon monoxide is converted to hydrogen in the presence of steam through the water-gas shift reaction represented by $CO + H_2O \rightarrow CO_2 + H_2$. The content of carbon monoxide is reduced to less than one mole % after the water-gas shift reaction. A mixture of hydrogen, carbon dioxide, unreacted carbon monoxide and other impurities is discharged via outlet 452 as shifted syngas. High purity hydrogen gas is optionally recovered by a process such as pressure swing adsorption (PSA), or by use of membranes, absorption, adsorption, or combinations thereof.

The addition of a solid ash-producing material to hydrocarbon disulfide oil stream 422 feed in embodiments wherein a membrane wall partial oxidation gasification reactor is used is required to form sufficient slag material to condense on the cooled reactor sidewall to form a protective solid slag coating and flow of molten liquid slag. The solid ash-producing material can include natural and/or synthetic oxides. Suitable materials for forming the slag on the reactor walls are one or more oxides of elements from Groups IA-VA, IVB, VIIIB of the Periodic Table. Preferred compounds include one or more oxides of Si, Al, Fe, Ca, Mg, P, K, Na, S and Ti. The oxides are of the type typically produced by the partial combustion of coal. The amount of sulfur present in heavy oils such as vacuum residues, bitumens, and in solids such as asphaltenes and coke is high and the oxides formed are solid sulfates or sulfites. The solid ash-producing material content can constitute from 2% to 10 w % of the disulfide oil hydrocarbon stream, with lower values in the range being preferred. In some embodiments, the solid ash-producing material content can constitute from 2% to 5 w % of the disulfide oil hydrocarbon stream.

The solid ash-producing material is preferably in the form of finely divided particles that are free-flowing in a dry state. The particle size is sufficiently small to avoid any clogging of nozzles or other distribution means in the reactor. The particles should pass Tyler mesh size 35 screen. These particles are preferably introduced into the liquid feed sufficiently upstream of the membrane wall reactor to provide for their distribution throughout the flowing feed stream. In order to assure a uniform mixing of the particles, the feed stream can be passed through an in-line mixer, or other devices that are known in the art to achieve the desired degree of mixing of a dry material in a liquid stream to which it is added.

In other embodiments, the dry particulate material can be treated, e.g., by spraying with surfactant, to facilitate mixing with the disulfide oil hydrocarbon stream. In order to facilitate pumping and metering, the dry particulate material(s) can be premixed with a portion of the whole crude oil feed, or some other liquid hydrocarbon material in a separate mixing vessel and stored or directly withdrawn as needed and added as a concentrated solid/liquid mixture in the appropriate proportion to the disulfides hydrocarbon stream to achieve the desired weight percentages of solid ash-producing material.

In general, the operating conditions for the refractory gasifier or the membrane wall gasification reactor include a temperature in the range of from 1200° C. to 1800° C.; a pressure in the range of from 10 or 20 bars to 100 bars; a mole ratio of oxygen-to-carbon content of the feedstock in the range of from 0.1:1 to 2:1, in certain embodiments from 0.5:1 to 2:1, and in further embodiments from 1:1 to 5:1; a mole ratio of steam-to-carbon content of the feedstock in the range of from 0.1:1 to 10:1, in certain embodiments from 0.1:1 to 2:1, and in further embodiments from 0.4:1 to 0.6:1.

The properties of the syngas subjected to the water-gas shift reaction are a temperature in the range of from 150° C. to 400° C.; a pressure in the range of from 1 bar to 60 bars; and a mole ratio of water-to-carbon monoxide in the range of from 3:1 to 5:1.

Valuable syngas and/or hydrogen gas, process steam and electricity are efficiently produced for on-site refinery use. The process of the present invention can be practiced to particular advantage when hydrogen is needed for hydroprocessing and natural gas is not readily available. This is usually the case in refineries when full conversion is required to meet the demand for cleaner and lighter products, such as gasoline, jet fuel, and diesel transportation fuels.

EXAMPLES

A model was developed internally and used to determine the product yields of the following simulated runs in Examples 1 and 2.

Example 1

A 100 kg disulfide oil sample was introduced as a pressurized feedstock into a gasification reactor. The composition and properties of the model feed in Example 1 are as listed in Table 1.

TABLE 1

| Disulfide Oil | W % | BP (° C.) | MW (g/g · mol) | Sulfur, W % |
|---|---|---|---|---|
| Dimethyl disulfide | 15.7 | 110 | 94 | 68.1 |
| Diethyl disulfide | 33.4 | 152 | 122 | 52.5 |
| Methyl ethyl disulfide | 49.3 | 121 | 108 | 59.3 |
| Total (Average) | 98.4 | (127.7) | (109) | (57.5) |

Table 2 is the material balance for the process of Example 1. The gasification reactor was operated at a temperature of 1045° C. and at a pressure of 28 bars. The weight ratio of steam-to-carbon in the gasifier is 0.4:1. The molar ratio of oxygen-to-carbon is 2:1. The disulfide oil is partially oxidized to produce hydrogen and carbon monoxide which are recovered as a hot raw syngas and passed to a heat exchanger to generate steam. The cooled raw syngas is sent to a water-gas shift reaction vessel to increase the hydrogen yield. The water-gas shift reaction is conducted at 318° C. and 1 bar. The molar ratio of water-to-carbon monoxide is 3:1.

The product yields for the process in Example 1 are listed in the material balance shown in Table 2. The gasification of the 100 kg sample of disulfide oil in Example 1 produces 6.2 kg of hydrogen gas.

TABLE 2

| Reactor | MW, Kg/Kg · mol | Gasifier In (kg) | Gasifier Out (kg) | WGS In (kg) | WGS Out (kg) |
|---|---|---|---|---|---|
| HC | | 37.5 | | | |
| Sulfur | | 58.4 | | | |
| Oxygen (gas) | 32.0 | 191.8 | 148.6 | | |
| CH4 | 16.0 | | 3.9 | 3.9 | 3.9 |
| H2 | 2.0 | | 2.5 | 2.5 | 6.2 |
| CO | 28.0 | | 54.2 | 54.2 | 2.7 |
| CO2 | 44.0 | | 16.9 | 16.9 | 97.7 |
| H2O | 18.0 | 37.5 | 35.8 | 71.6 | 38.5 |
| H2S | 34.0 | | 58.9 | 58.9 | 58.9 |
| COS | 60.0 | | 5.5 | 5.5 | 5.5 |
| Total | | 325.2 | 326.2 | 213.4 | 213.4 |

Example 2

A blended sample of 10 kg disulfide oil and 90 kg of residual oil was introduced as a pressurized feedstock into a partial oxidation gasification reactor. The composition and properties of the feed in Example 2 are listed in Table 3. The disulfide oil has the same composition and properties as the DSO used in Example 1, i.e., as indicated in Table 1. The residual oil contained 84.33 W % of carbon, 10.43 W % of hydrogen, 4.25 W % of sulfur and 0.99 W % of nitrogen.

Table 3 is the material balance calculated for the process of Example 2. The gasification reactor is operated at a temperature of 1045° C. and at a pressure of 28 bars. The weight ratio of steam-to-carbon in the gasifier is 0.4:1. The molar ratio of oxygen-to-carbon is 2:1. The disulfide and residual oil is partially oxidized to produce hydrogen and carbon monoxide which are recovered as a hot raw syngas and passed to a heat exchanger to generate steam. The cooled raw syngas is sent to a water-gas shift reaction vessel to increase the hydrogen yield. The water-gas shift reaction is conducted at 318° C. and 1 bar. The molar ratio of water-to-carbon monoxide is 3:1.

The calculated product yields resulting from the gasification of the 100 kg sample of disulfide oil and residual oil blend in Example 2 produces 15.8 kg of hydrogen gas.

TABLE 3

| Reactor | MW, Kg/Kg · mol | Gasifier In (kg) | Gasifier Out (kg) | WGS In (kg) | WGS Out (kg) |
|---|---|---|---|---|---|
| HC | | 80.6 | | | |
| Sulfur | | 9.7 | | | |
| Oxygen (gas) | 32.0 | 180.5 | 86.3 | | |
| CH4 | 16.0 | | 9.0 | 9.0 | 9.0 |
| H2 | 2.0 | | 7.2 | 7.2 | 15.8 |
| CO | 28.0 | | 125.8 | 125.8 | 6.3 |
| CO2 | 44.0 | | 39.3 | 39.3 | 227.1 |
| H2O | 18.0 | 80.6 | 73.2 | 146.5 | 69.6 |
| H2S | 34.0 | | 9.8 | 9.8 | 9.8 |
| COS | 60.0 | | 0.9 | 0.9 | 0.9 |
| Total | | 351.3 | 351.4 | 338.4 | 338.4 |

The process of the present invention has been described above and in the attached figures; process modifications and variations will be apparent to those of ordinary skill in the art from this description and the scope of protection for the invention is to be defined by the claims that follow.

I claim:

1. An integrated process for the treatment of a disulfide oil hydrocarbon stream comprises:
    a. introducing the disulfide oil hydrocarbon stream as a gasifier feed into a partial oxidation gasification reactor with a predetermined amount of oxygen and steam based on the carbon content of the disulfide oil hydrocarbon stream,
    wherein the disulfide oil hydrocarbon stream is an effluent refinery hydrocarbon stream recovered downstream of a MEROX process;
    b. subjecting the disulfide oil hydrocarbon stream to partial oxidation to produce a hot raw synthesis gas containing hydrogen and carbon monoxide;
    c. passing the hot raw synthesis gas to a steam-generating heat exchanger to cool the hot raw synthesis gas and to produce steam;
    d. introducing the steam from the heat exchanger into a turbine to produce electricity; and
    e. recovering the cooled synthesis gas.

2. The process of claim 1 that comprises mixing the disulfide oil hydrocarbon stream with a residual hydrocarbon stream to form the gasifier feed.

3. The process of claim 2 in which the gasification reactor is a refractory gasification reactor.

4. The process of claim 2 in which the gasification reactor is a membrane wall gasification reactor.

5. The process of claim 2 further comprising subjecting the cooled synthesis gas to a water-gas shift reaction with a predetermined amount of steam, and recovering a mixture of hydrogen and carbon dioxide.

6. The process of claim 1 in which the gasification reactor is a membrane wall gasification reactor.

7. The process of claim 6 in which the gasifier feed comprises a solid ash-producing material.

8. The process of claim 7, wherein the solid ash-producing material is in the form of finely divided particles and constitutes from 2% to 5% by weight of the total weight of the gasifier feed.

9. The process of claim 6, wherein the solid ash-producing material is selected from the group consisting of natural and synthetic oxides of Si, Al, Fe, Ca, Mg, P, K, Na, S and Ti, and mixtures thereof.

10. The process of claim 6, wherein the operating temperature of the gasification reactor is in the range of from 1200° C. to 1800° C.

11. The process of claim 6, wherein the mole ratio of oxygen-to-carbon in the gasification reactor is in the range of from 0.2:1 to 2:1.

12. The process of claim 6, wherein the weight ratio of steam-to-carbon in the gasification reactor feed is in the range of from 0.1:1 to 10:1.

13. The process of claim 1 further comprising subjecting the cooled synthesis gas to a water-gas shift reaction with a predetermined amount of steam, and recovering a mixture of hydrogen and carbon dioxide.

14. The process of claim 13, wherein the mole ratio of water-to-carbon monoxide in the water-gas shift reaction vessel is in the range of from 5:1 to 3:1.

15. The process of claim 1 in which the gasification reactor is a refractory gasification reactor.

* * * * *